(12) United States Patent
Kopf et al.

(10) Patent No.: US 8,861,563 B2
(45) Date of Patent: Oct. 14, 2014

(54) FOLDING ELEMENT FOR A LASER-SETUP (75) Inventors: Daniel Kopf, Altach (AT); Max Lederer, Alberschwende (AT); Udo Bunting, Hohenems (AT)

(73) Assignee: High Q Laser GmbH, Rankweil (AT)

( * ) Notice: Subject to any disclaimer, the term of this patent is extended or adjusted under 35 U.S.C. 154(b) by 1599 days.

(21) Appl. No.: 10/543,490

(22) PCT Filed: Jan. 28, 2004

(86) PCT No.: PCT/EP2004/000730
§ 371 (c)(1),
(2), (4) Date: Jul. 26, 2005

(87) PCT Pub. No.: WO2004/068656
PCT Pub. Date: Aug. 12, 2004

(65) Prior Publication Data
US 2006/0193362 A1    Aug. 31, 2006

Related U.S. Application Data

(60) Provisional application No. 60/442,917, filed on Jan. 28, 2003.

(51) Int. Cl.
*H01S 3/08* (2006.01)
*H01S 3/063* (2006.01)
*G02B 17/00* (2006.01)
*H01S 3/094* (2006.01)
*H01S 3/081* (2006.01)
*H01S 3/0941* (2006.01)
*H01S 3/06* (2006.01)
*H01S 3/113* (2006.01)
*G02B 3/04* (2006.01)
*H01S 3/00* (2006.01)

(52) U.S. Cl.
CPC ......... *G02B 17/004* (2013.01); *H01S 3/094084* (2013.01); *H01S 3/08081* (2013.01); *H01S 3/0815* (2013.01); *H01S 3/09415* (2013.01); *H01S 3/0615* (2013.01); *H01S 3/113* (2013.01); *G02B 3/04* (2013.01); *H01S 3/0057* (2013.01); *H01S 3/0816* (2013.01); *H01S 3/08* (2013.01); *H01S 3/0813* (2013.01); *H01S 3/063* (2013.01); *H01S 3/08095* (2013.01); *H01S 3/0606* (2013.01)
USPC .............................................. 372/93; 372/99

(58) Field of Classification Search
USPC ....................................................... 372/93, 99
See application file for complete search history.

(56) References Cited

U.S. PATENT DOCUMENTS 4,785,459 A    11/1988  Baer
5,237,584 A    8/1993   Shannon et al.
(Continued)

FOREIGN PATENT DOCUMENTS

| EP | 1 115 186 A | 7/2001 |
|---|---|---|
| JP | A 07-335962 | 12/1995 |
| WO | WO 02/11252 A2 | 2/2002 |
| WO | WO 02/060020 A2 | 8/2002 |

OTHER PUBLICATIONS

J. B. Deaton, Jr. et al. "Generation of narrow-band ultrasound with a long cavity mode-locked Nd: YAG laser," Appl. Phys. Lett. 56 (24), Jun. 11, 1990, pp. 2390-2392.

(Continued)

*Primary Examiner* — Colleen Matthews
*Assistant Examiner* — Marcia Golub-Miller
(74) *Attorney, Agent, or Firm* — Oliff PLC (57) ABSTRACT

The use of reflecting surfaces that are inclined towards one another enables the multiple reflection of a beam path to be achieved in a laser structure. This permits the realization of compact laser assemblies. The introduction of beam-influencing media between the reflective surfaces or the configuration of said reflective surfaces from or using media of this type allows the use of the multiple reflection for influencing parameters of the radiation or radiation field.

29 Claims, 11 Drawing Sheets

(56) References Cited

U.S. PATENT DOCUMENTS

| | | | |
|---|---|---|---|
| 5,651,021 | A | 7/1997 | Richard et al. |
| 6,272,156 | B1 | 8/2001 | Reed et al. |
| 2002/0150132 | A1 | 10/2002 | Peressini |
| 2003/0063884 | A1 | 4/2003 | Smith et al. |

OTHER PUBLICATIONS

J. B. Deaton, Jr. et al., "Variable-cavity length mode-locked Nd:YAG laser for noncontact generation and spectral control of narrow-band ultrasound" Applied Optics, vol. 33, No. 6, pp. 1051-1058, Feb. 20, 1994.

N. H. Schiller, et al. "Compact picosecond Nd:glass mode-locked laser with variable cavity length from 5 to 21 m," Applied Optics, vol. 28 No. 5, Mar. 1, 1989, pp. 946-1058.

J. B. Deaton, Jr. et al., "Variable-cavity length mode-locked Nd:YAG laser for noncontact generation and spectral control of narrow-band ultrasound" Applied Optics, vol. 33, No. 6, pp. 1051-1058.

D. Herriott et al., "Off-Axis Paths in Spherical Mirror Interferometers," Applied Optics, vol. 3, No. 4, Apr. 1964, pp. 523-526.

A. E. Siegman, *Lasers*, University Science Books, 1986, ISBN 0935702113, pp. 581-814.

FOLDING ELEMENT FOR A LASER-SETUP

This application claims the benefit of U.S. Provisional Application No. 60/442,917, filed Jan. 28, 2003. The entire disclosure of the prior application is hereby incorporated by reference herein in its entirety.

The invention concerns a fold device according to the preamble of claim 1 for a compact laser, the use of a fold device for guiding beams in a laser, and a laser assembly according to the preamble of claim 16.

Increasingly, a compact structure making possible further advantages such as, for instance, a better insulation of the laser against environmental impacts is demanded of laser setups for industrial and scientific applications. However, the lengths of beam paths in a resonator either have physical reasons or are at least associated with the specific advantages of a particular structure; therefore, long beam paths or long free beam travel and a compact structure should be attained to the same degree.

This is true, for instance, for Nd:YAG or Nd:vanadate-based lasers operated through mode coupling. Normally these lasers have resonator sizes of some 1.5 meters or more, and thus are not suitable without further actions for applications requiring a particularly compact structure. Such an action can for instance be the combination of Q-switching and mode coupling, which makes possible a compact laser structurecombining high pulse repetition frequencies of more than 100 kHz with high simultaneous output power. Such a solution is described for instance in WO 02/11252, this document being regarded as included herein by way of reference.

Where such alternative actions are not possible or not advantageous, a compact structure can be attained by folding the beam path using a series of mirrors having matched geometries. Examples for a specific arrangement and sequences of folding mirrors are known, e.g, from WO 02/060020, this document being included herein by way of reference.

Apart from the requirement of a particularly compact structure, often a need exists to guide the beam a number of times through a given medium within a resonator or outside of it. This will amplify the effect attained by a single pass, or achieve the superposition of different partial beams. The number of passes is a decisive criterion for the size of the effect to be attained, and should thus be increased. In assemblies known so far, however, a higher number of passes in most cases will lead to higher complexity because of the need for additional components and of their mutual arrangement.

Multiple passes through a suitable component such as a Gires—Tournois interferometer or another dispersive structure, for instance, yield a negative or positive dispersion correction of the beam that is larger than that attained with a single pass.

Examples for the combination of partial beams and multiple exploitation of a medium are known, e.g., from U.S. Pat. No. 4,785,459 and U.S. Pat. No. 5,237,584. Both documents are regarded as being included herein by way of reference.

U.S. Pat. No. 4,785,459 describes a device for generating a laser beam having multiple laser media and folding mirrors equidistantly arranged in a zig-zag structure. The beam path of the resonator goes through all laser media which, on a side facing away from the resonator, can be pumped by an external light source.

U.S. Pat. No. 5,237,584 shows a solid-state laser involving transverse pumping produced by multiple equidistant laser diodes set up in a straight line. Inside the laser medium the beam is guided zig-zag from a given laser diode to the next, with a reflection always occurring at the inner surface of the medium located opposite to the laser diodes.

These solutions for folding of a beam path have a multitude of individual components that must all be separately mounted, aligned, or adjusted and fixed. A design with single components that must be fixed relative to each other, always comprises the risk that mechanical impacts will cause loss of adjustment of individual components.

Also, the beam path from one end of the resonator to the other end of the resonator or to the laser medium always goes through the same reflection points, hence the partial beams are not separated. In the instance of materials undergoing degradation under the action of light, for instance, this may lead to incomplete utilization of the volume of material that is actually available. On the other hand, the size of the beam cross section must be tuned to the given reflection point or to the component defining this point, implying that the beam cross section will be limited by the components while changes in alignment of the components, for instance by external impacts, may in addition give rise to loss of adjustment. In addition, this limits subsequent changes in beam profile or beam path.

It is the basic task of the invention, therefore, to provide a device that will make possible an improved compactness of a laser.

It is a further task to make possible a larger number of passes through a medium influencing the beam properties while at the same time providing a compact structure.

Further tasks are a higher design flexibility with respect to subsequent changes and enhanced robustness with respect to environmental impacts.

Yet further tasks reside in an improved separation of partial beams and in an improved exploitation of a volume of material that is available.

According to the invention, these tasks are solved or the solutions further developed by the characteristics of claims 1, 15 and 16 as well as by the characteristics of the dependent claims.

These tasks are solved according to the invention, or the solution is further developed, by the use of a fold device having specific properties. A fold device according to the invention has at least two converging or mutually tilted, reflecting planes between which the beam path is guided. These planes may be constituted both by the external surfaces of several reflective elements and by the inner surfaces of a single element. That is, reflection occurs at a transition between at least two media of different optical refractive indices.

Contrary to solutions involving curved mirror surfaces such as focal or confocal resonators, the planes are planar and have a slight mutual tilt, which means that when used within a cavity, the fold device represents an unstable resonator. The fold device according to the invention thus also differs from other multiple-pass resonators such as a Herriott cell or a White cell described for instance in the documents of N. H. Schiller, X. M. Zhao, X. C. Liang, L. M. Wang, and R. R. Alfano, Appl. Opt., 28, 946 (1989); J. B. Deaton, Jr., A. D. W. McKie, J. B. Spicer, and J. W. Wagner, Appl. Phys. Lett., 56, 2390 (1990); J. B. Deaton, Jr., and J. W. Wagner, Appl. Opt., 33, 1051 (1994), as well as D. Herriott, H. Kogelnik, and R. Kompfner, Appl. Opt., 3, 523 (1964). All four documents are herewith regarded as being included herein by way of reference. When compared to such arrangements having curved surfaces, and particularly to arrangements using aspherical surfaces, the surfaces in the fold device according to the invention are less demanding in manufacturing effort and manufacturing precision.

Preferably, large part of the beam path is guided between just two reflecting surfaces, thus the number of components is kept as small as possible. However, sequences of several of such pairs of reflective surfaces can more particularly be used as well to realize compact multiple-stage structures.

According to the invention, the two surfaces are not oriented in parallel but tilted to form an angle between them. This changes the distance between reflection points giving rise to variable spacing separating the partial beams within the structure. Because of the angle between the two reflecting planes, there is a continuous change in the angle of reflection. For the incoming beam here being guided with its direction of propagation toward the fold device, the angle relative to the surface normal continuously decreases with each consecutive reflection until it leads to a change in the direction of propagation at an inversion point, from where the beam is guided back to its point of incoupling into the fold device.

According to the invention, a fold device can also be formed with an angle between the planes that can be adjusted or varied, so that the geometric conditions of reflection can be matched to a given setup.

In a fold device that is configured as a continuous surface, limitations that existed up to now with respect to beam cross section and adjustment or with respect to a possible mutual misalignment of folding mirrors, now disappear.

In a simple variant, a fold device according to the invention is formed by two laser mirrors having an essentially rectangular cross section which are arranged facing each other. Both mirrors are slightly tilted relative to each other, and in this example are set up inside a laser resonator. After being coupled into the fold device, the beam basically runs zig-zag through this element, but with the distances between the reflection points continuously changing. At the end of the fold device the beam is reflected back or coupled out, and is returned into the fold device after its reflection at a mirror element that can for instance also serve as a beam splitter for outcoupling of the laser beam, hence another beam path than the first beam passage follows.

Reflection can also be produced by a configuration of surfaces or interfaces that is known per se, in which case coatings that reinforce or reduce reflection can be applied according to the invention.

In another possible embodiment the fold device is realized as a monolithic structure having two outer surfaces that are mutually slightly tilted, that is, two surfaces or interfaces that are not exactly parallel. Now the beam path within the structure is similar to that of the first embodiment. In particular, the laser medium can be configured so that it will give rise to such a beam path, and hence functions at once as a fold device according to the invention.

For an amplification of effects influencing the beam, for instance by multiple passes through a layer, one of the reflecting surfaces or both of them can, in a further embodiment, be configured simultaneously as such a beam-influencing structure. For instance, a dispersive structure, e.g., a Gires—Tournois interferometer, can be used as one of the two reflecting surfaces. As an alternative, the path may be completely within a layer or within a corresponding body. In this way a dispersion management can be attained in cavity-dumped oscillators and regenerative amplifiers. Depending on the application, a selectable positive or negative dispersion can be generated according to the invention which cannot be realized in a sufficiently compact configuration by other means such as prism lines and/or individual Gires—Tournois interferometers.

Fundamentally, the surfaces or interfaces of the fold device according to the invention can also be replaced or supplemented by further optical components or components of a different kind. In particular, specific diffractive structures such as holograms can be used to guide or influence the beams.

Likewise, the use of a fold device according to the invention is not restricted to being placed into a laser resonator. A fold device can for instance be used both within the resonator and outside of it to stretch or compress pulses.

According to the invention, several fold devices can also be combined in series or on top of one another, making possible additional structural compactness or the meeting of specific requirements by the components. Thus, two fold devices can be combined, one of them serving to optimally fold the free beam path and thus reduce overall length, the other fold device being optimized with respect to a dispersion correction.

With a fold device, however, the laser becomes more sensitive to adjustment, since additional tilt from the state of optimum adjustment may displace the beam position of the laser mode. This may make it more difficult or impossible to meet the laser conditions such as a vertical impingement of the laser mode on the end mirror in a standing-wave resonator. When the beam position in the laser medium is displaced from the excited pump spot, a less perfect overlap between laser mode and pump spot will come about so that the power decreases or is no longer at the optimum point.

In the multiple reflections in a fold device according to the invention, reflecting elements such as mirror surfaces are used more than once for reflection. This implies accumulation of any angular deviation with increasing number of the reflections. In the presence of a relative adjustment error of the two reflecting elements, this may lead to an undesirably high sensitivity of the optical elements. Among adjustment errors, it is intended in this connection to take into account as well such other errors with the same consequences as may arise because of shape or manufacturing errors. The optical layout of the laser (configuration of the cavity) or the arrangement of all laser elements can be tuned in an optimum way so as to avoid such adjustment errors. Specifically, the position of the fold device within the resonator, the surrounding optical resonator elements, the number of reflections in the fold device, and the distance of the reflecting elements in the fold device are taken into account in order to reduce the sensitivity to adjustment errors.

For modeling and calculations, the specialist can use generally applicable approaches such as the ABCDEF matrix method described in Siegman, A. E., *Lasers*, University Science Books, 1986, ISBN 0935702113.

A fold device tilted by an error angle $\delta$ can be described as an—unfolded—optical path of the length 2 NL, where L is the distance between the reflecting elements and N is the number of reflections. At the midpoint of this path, a mirror misaligned by $2 \cdot N \cdot \delta$ will then exist when an error is present. This simplified though correct picture has facilitated the derivation of error-insensitive arrangements consisting of a fold device and an adjusting element suitable to allow for the error.

Basically two approaches can be considered for taking into account adjustment errors. On the one hand, the error can be corrected in a direct way, for instance by a beam return path through the error-affected fold device. Such a return can be produced for instance by a curved mirror that will reflect the beam back into itself or with a slight offset, for all angles of emergence from the reflecting elements of the fold device.

On the other hand, the beam path can be influenced in such a way that the laser conditions are met without properly correcting the error. To this extent the error is accepted, but its consequences are compensated or neutralized. An example of such a solution can be realized when placing a fold device into a resonator in such a way that the fold device is located at one end of the cavity, and is followed by a lens having a focus of f=2·N·L/2 and by the end of the cavity with planar end mirror.

When correctly selecting the focal length—that is, f=N·L—and position of the lens—that is, following right after the fold device—a situation is created where the laser condition is not affected when an adjustment error is present, and hence the laser, despite the error, is not limited in its functions. The laser power thus is independent of an adjustment error or other deviation from the nominal layout, or the fold device is insensitive to angle deviations. This is valid at least for small δ so long as the beam offset is still within the aperture of the optical elements, and more particularly within the lens aperture. Instead of a single lens, those skilled in the art will be able to derive general ABCD optical systems having an equivalent effect.

For instance, in a fold device traversed two times in a symmetric way, the beam offset and tilt resulting from adjustment errors can be minimized when selecting an appropriate lens with f=2·N·L/4=N·L/2, since it is canceled by the lens during the second pass. This symmetric example is applicable analogously to specially arranged asymmetric configurations. Those skilled in the art will again be able instead of the lens to derive an equivalent optical element or system with a similar error-compensating effect. This system can consist of several lenses, curved mirrors, and path sections. When incorporating a compensated fold device into the resonator, those skilled in the art will generally strive to build a resonator which, apart from the above arrangements designed to achieve reduced sensitivity, will be stable as well with respect to the modes and at the same time have an appropriate laser mode radius on important laser elements such as the laser medium and the saturable absorber.

These thoughts and measures designed to reduce the sensitivity with respect to adjustment errors are applicable not only to a fold device used in a cavity but also to arrangements outside the cavity. The compensating and neutralizing effects are applicable, not only to reflecting elements having a positive aperture angle but also, according to the invention, to configurations having a strictly parallel path, such as a plane-parallel pair of mirrors.

The fold device according to the invention and lasers that can be realized with it, are described in the following by adducing purely by way of example, embodiments schematically represented in the drawing. In detail.

Figure 1:
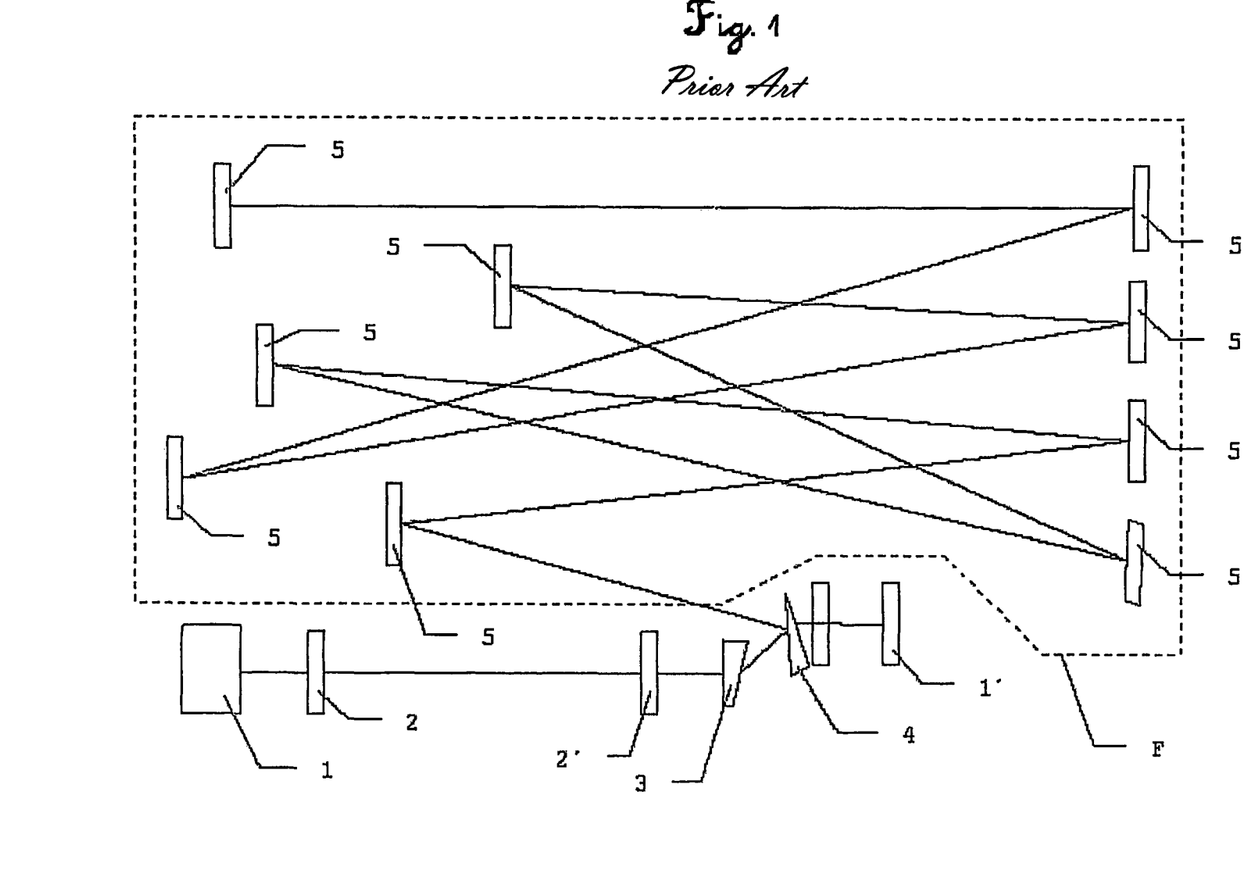
FIG. 1 shows the schematic representation of a laser structure of the prior art including a sequence of several folding mirrors.

In FIG. 1, a laser setup of the prior art is described where a system of folding mirrors is used to reduce the overall length. The laser essentially consists of a pump laser source 1, e.g., a laser diode pumping a laser medium 3 via a transmitting optics consisting of a collimating lens 2 and a focussing lens 2', where the laser medium 3 is a component of a laser resonator but may also constitute one end of the resonator. A second pump laser source 1' is used for coupling light via prism 4 from another side into the laser medium 3. The beam path is introduced via this prism 4 into the folded part F of the resonator. This part F incorporates a sequence of specially positioned folding mirrors 5 reducing a long free beam path to a compact base area. The large number of folding mirrors 5 and the requirement of an exact alignment cause the setup to become complex and susceptible to errors and disturbances or environmental influences.

Figure 2:
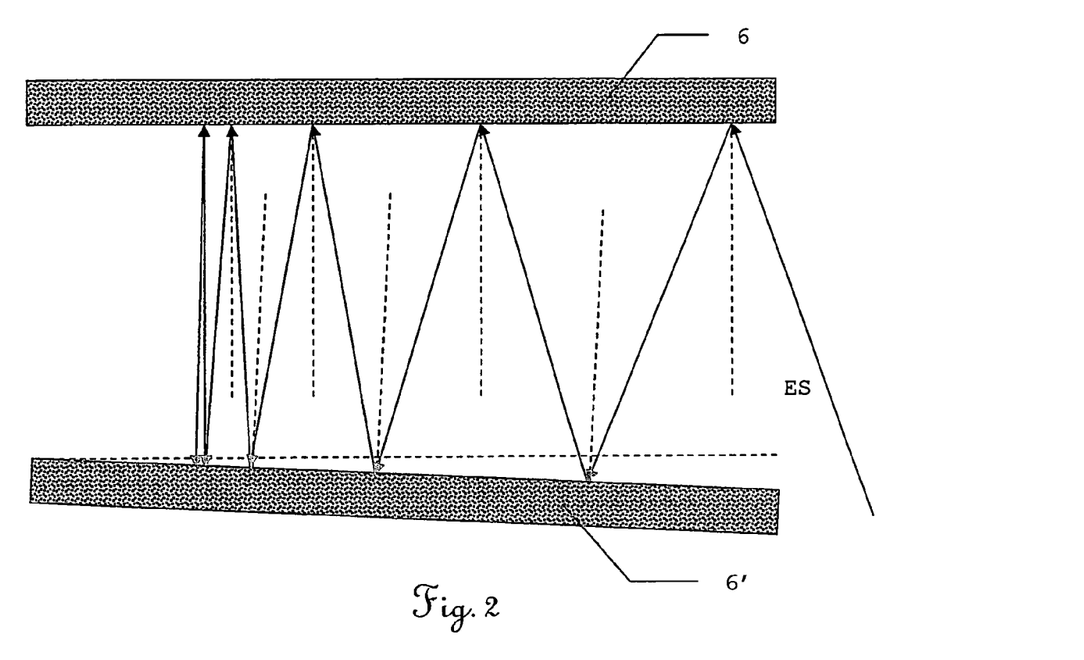
FIG. 2 shows the schematic representation of the reflection conditions between two reflecting surfaces.

FIG. 2 shows the sequence of reflections occurring between two reflecting surfaces in a first embodiment of the fold device according to the invention. In this variant the fold device is formed by two reflecting elements 6 and 6' set up at a mutual angle such that an incident beam coming from the right in this figure will be reflected back to the right after undergoing multiple reflections. The surface normals of the two elements 6 and 6' are indicated in dashed lines in the figure. Because of the position of the two elements, the angle between the surface normal and the beam becomes increasingly smaller from right to left until it almost corresponds to the normal.

Figure 3:
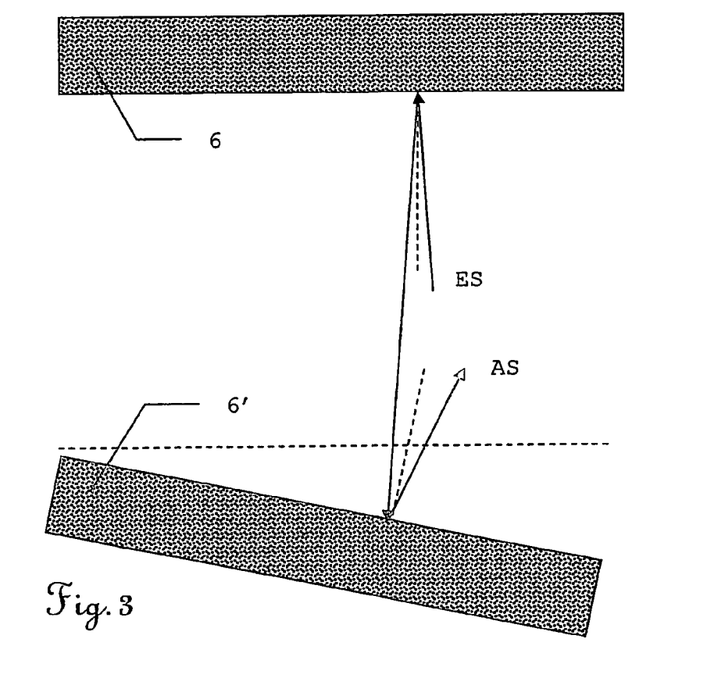
FIG. 3 shows the schematic representation of the beam path at the point of reversal of the direction of propagation.

This situation with an incident angle close to the surface normal is illustrated in FIG. 3. The beam ES incident to the surface of element 6 is reflected back into the opposite direction of propagation by the surface of element 6' as emergent beam AS. The distance between elements 6 and 6' is not drawn to scale but selected so as to illustrate the mode of action according to the invention.

Figure 4:
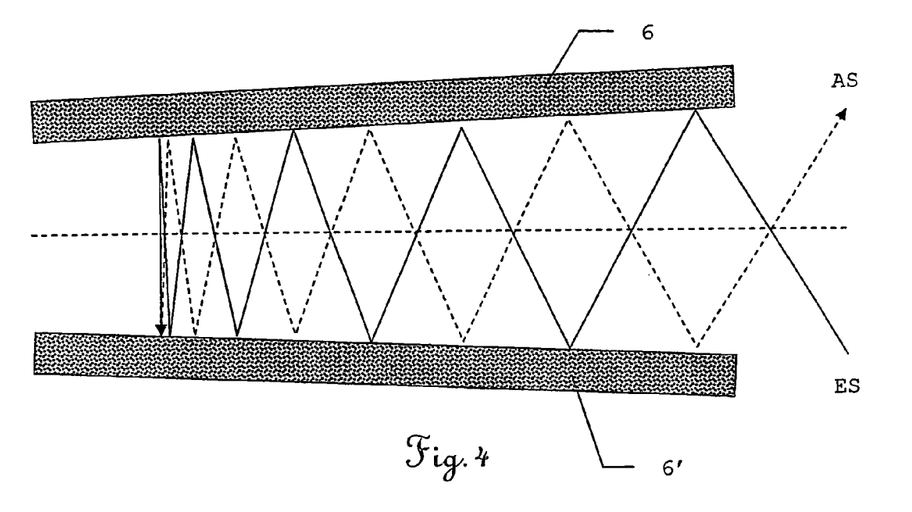
FIG. 4 shows the schematic representation of a first fold device according to the invention, with two reflecting elements.

FIG. 4 schematically represents a possible beam path in a first embodiment of the fold device according to the invention. The incident beam ES (solid line) undergoes multiple reflection by the two elements 6 and 6' while the distance between reflection points decreases continuously until at a reversal point it is reflected into the opposite direction of propagation so as to re-emerge from the fold device as emergent beam AS (dashed line) in a way similar to that of the incident beam. In this embodiment, one of the two elements 6 or 6' could be a structure with a layer having dispersive properties in or on top of a reflecting layer, so that the multiple reflections lead to frequent passes through this layer and a corresponding dispersion correction.

Figure 5:
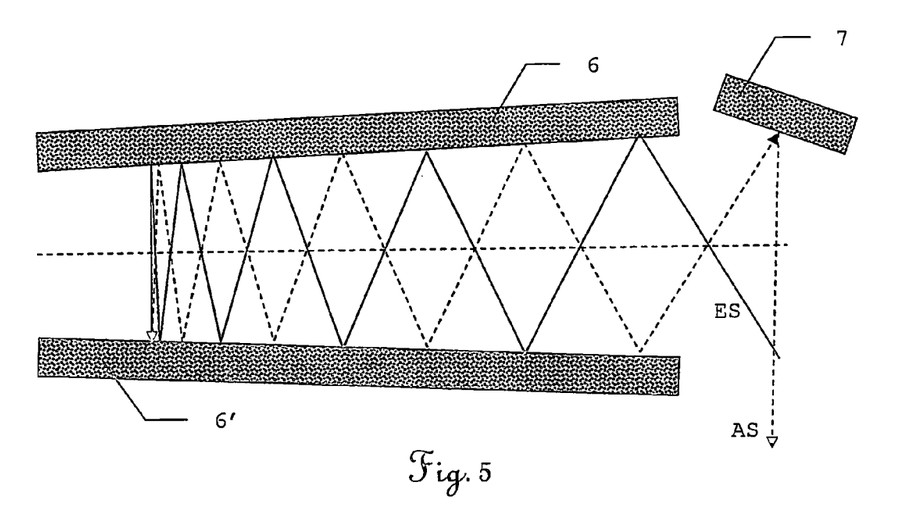
FIG. 5 shows the schematic representation of a first fold device according to the invention, with an additional deflecting mirror.

FIG. 5 shows the fold device of FIG. 4 in which an additional deflecting mirror 7 causes the emergent beam AS to be reflected in the direction from which the incident beam was coupled in. Depending on the orientation of deflecting mirror 7, the position of a component receiving the emergent beam can be selected so that a compact configuration of the laser components becomes possible.

Figure 6:
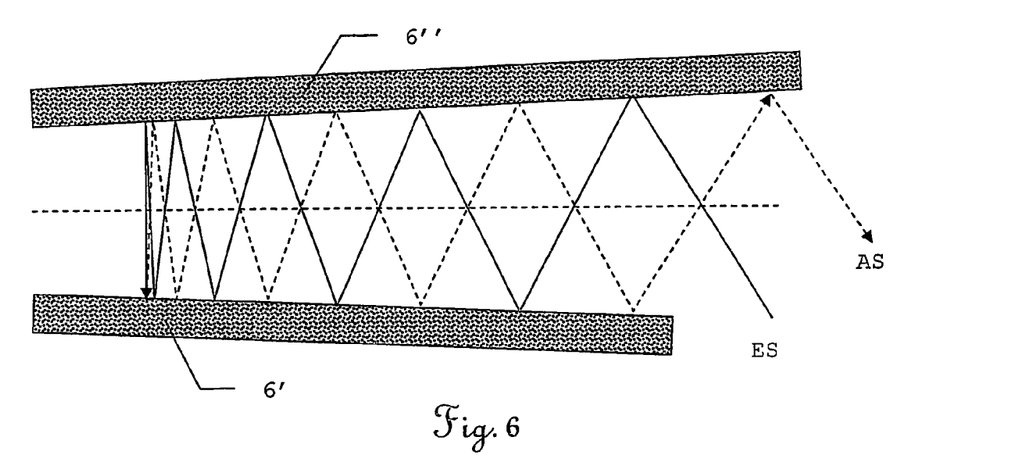
FIG. 6 shows the schematic representation of a second fold device according to the invention, in an asymmetric realization.

FIG. 6 shows how the deflecting effect from FIG. 5 is integrated into the fold device. Choosing a different length of the two elements 6' and 6", and hence an asymmetric design, one achieves a reflection of the emergent beam AS approximately parallel to the incident beam ES, so that entry and exit of the beams occur on the same side of the fold device.

Figure 7:
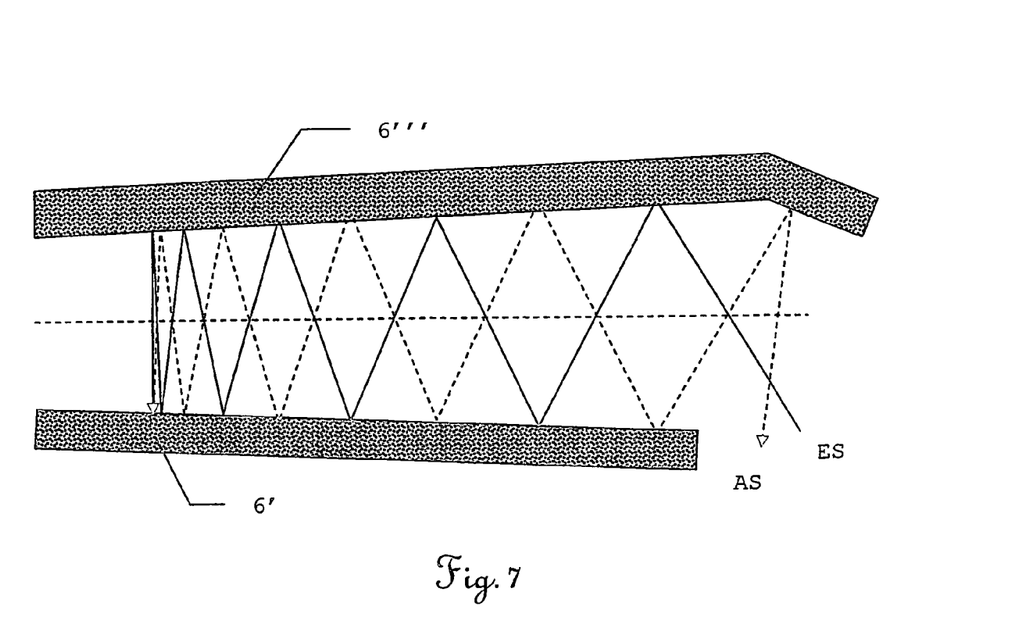
FIG. 7 shows the schematic representation of a third fold device according to the invention, in an asymmetric realization with two planar sectors.

How the effect of the deflecting mirror of FIG. 5 is integrated according to the invention into the fold device is shown in FIG. 7. Here the element 6'" is longer than element 6', and has two planar sectors with different angles of their surface normals. The action of a separate deflecting mirror thus is integrated into the single element 6'".

Figure 8:
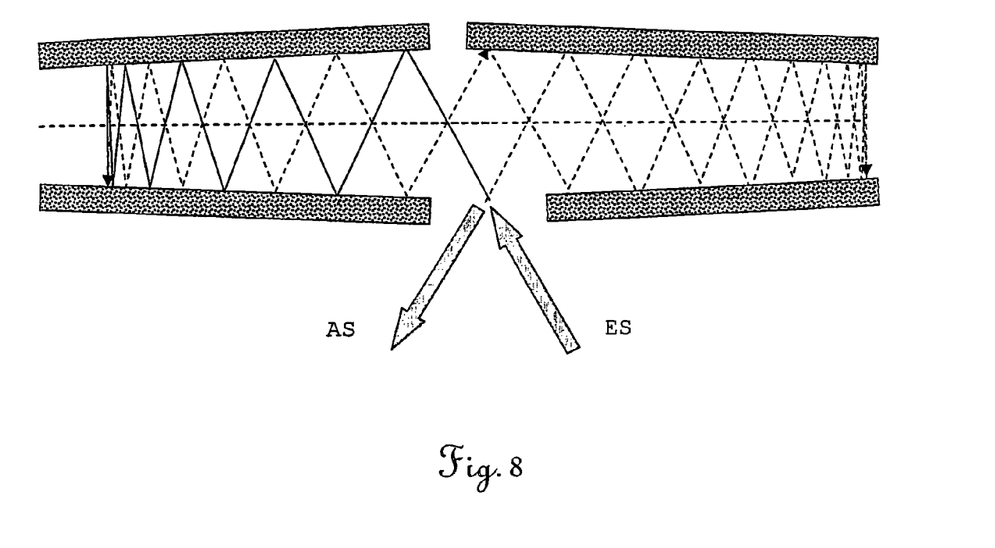
FIG. 8 shows the schematic representation of a sequence of fold devices according to the invention in a horizontal array.

FIG. 8 shows the combination of the first and second embodiment of the fold device to a horizontal sequence. The two fold devices face each other with their openings, here to be understood as the sides having the larger opening. Having passed the first embodiment situated to the left, the beam enters the second embodiment from which it is coupled out again after passing through it. Again, using the second embodiment causes the incident beam ES and emergent beam AS to enter and leave the combined fold device from the same side, though here the beams are not parallel. By adding further components or using a different design or disposition of the fold devices, other specially conceived beam paths can be produced. Thus, according to the invention, fold devices may be arranged in a number of different planes on top of each other or mutually offset as in a cascaded sequence.

Figure 9:
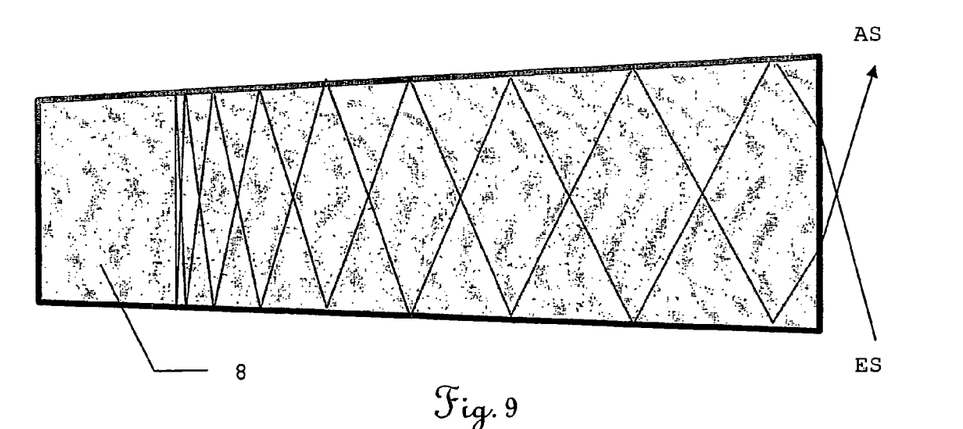
FIG. 9 shows the schematic representation of a fourth fold device according to the invention in monolithic design.

FIG. 9 shows a fourth embodiment of the fold device according to the invention. In a manner similar to that of FIG. 4, the beam path is inside a monolithic body 8, with the reflections occurring on the inside of body 8, that is, at its interfaces. To this effect, the monolithic body 8 has a trapezoidal longitudinal section, the incident beam ES entering the broader side and leaving again from this side after reflections and reversal of the direction of propagation. The material of the monolithic body 8 may for instance have special dispersive properties, or constitute the laser medium. In applications, this can for instance be used for pre-compensating dispersion such as that collected for multiphoton imaging in the lenses of a microscope. Further applications are available by suitable materials selection for the monolithic body 8 with respect to nonlinear optical effects as in optical parametric oscillators (OPO) or for frequency multiplication. However, a fold device according to the invention can be used to influence the radiation, even without particular materials properties, for instance when using optical glass, in situations where e.g. advantages with respect to mechanical stability are to be exploited.

Figure 10:
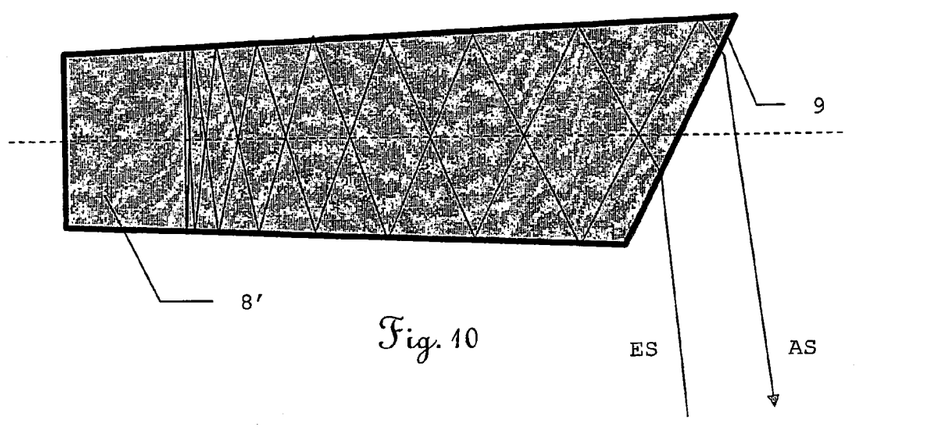
FIG. 10 shows the schematic representation of a fifth fold device according to the invention, in monolithic design with Brewster window.

FIG. 10 shows a fifth embodiment of a fold device according to the invention in monolithic design that is based on the fourth embodiment and has been modified in a way analogous to that of FIG. 6. Instead of a trapezoidal longitudinal section, this embodiment has a Brewster window on the entrance or exit side. The emergent beam AS undergoes one reflection more than the incident beam ES, hence its angle relative to Brewster window 9 is not the same as that of the incident beam ES close to its passage through the interface, and for this reason Brewster's law cannot hold exactly for both of the beams at a single surface. In addition, the two beams are slightly divergent. However, this embodiment has the advantage of easier realization.

Figure 11:
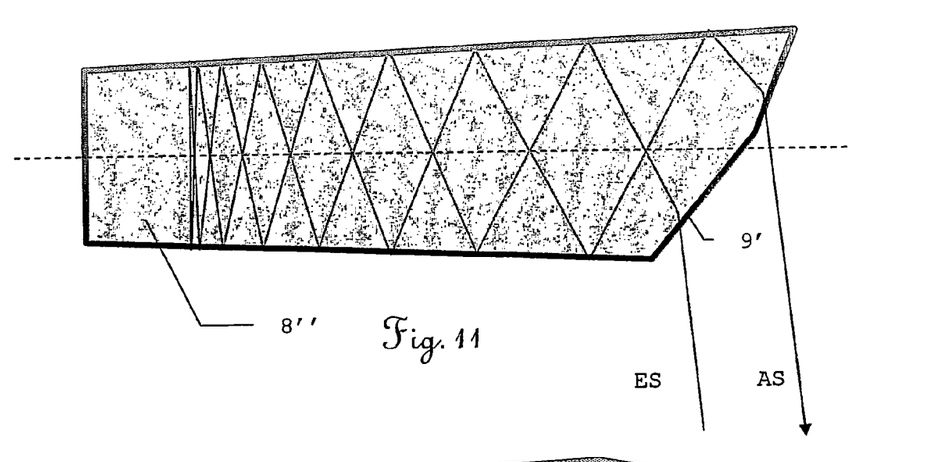
FIG. 11 shows the schematic representation of a sixth fold device according to the invention, in monolithic design with twofold Brewster window.

FIG. 11 shows how the Brewster window 9' can be adapted to the reflection conditions. Dividing the Brewster window 9' into two planar sectors set at an angle to each other one can obtain different orientations of the incident beam ES and emergent beam AS. By using these two sectors having different angles to the longitudinal axis of body 8", the Brewster condition can be satisfied both for the incident beam ES and for the emergent beam AS.

Figure 12:
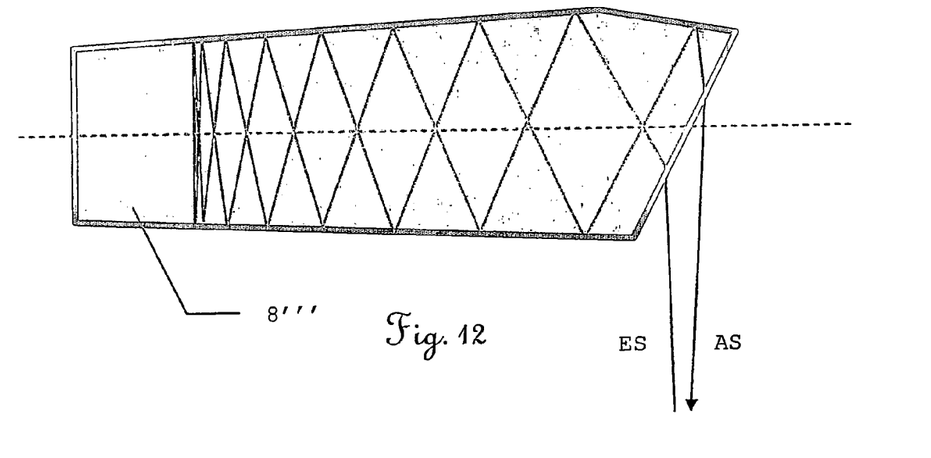
FIG. 12 shows the schematic representation of a seventh fold device according to the invention, in monolithic design with two planar sectors.

FIG. 12 shows a variant where the incident beam ES and emergent beam AS are convergent. A monolithic body 8'" is configured in a way similar to that of the embodiment shown in FIG. 7. To this end, one of the reflecting sides of body 8'" is designed with two planar sectors set at an angle to each other, so that the last reflection of the emergent beam can be varied or modified in its angle relative to the exit window, for instance by an appropriate polished section of body 8'". After a reflection with this angle, the emergent beam AS passes the exit window so as to be refracted toward the incident beam ES.

Figure 13:
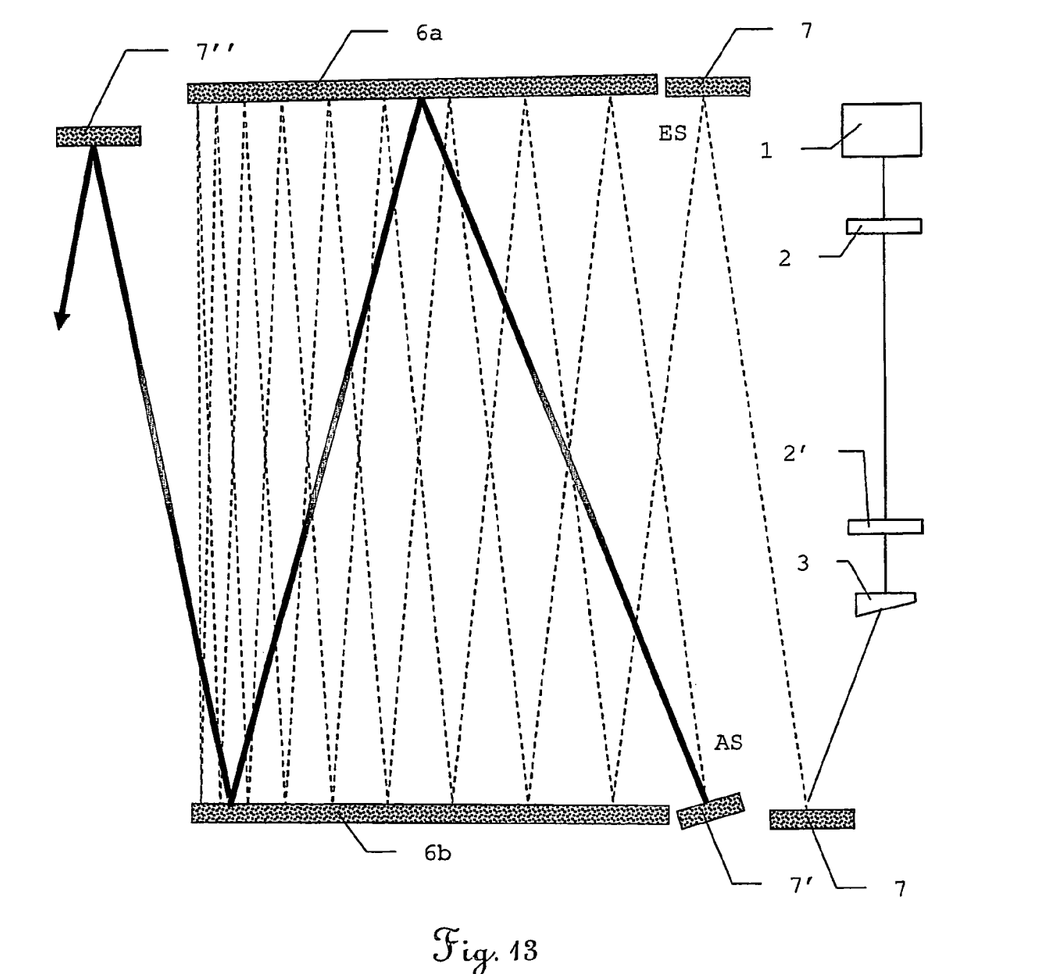
FIG. 13 shows the schematic representation of a laser setup including a fold device according to the invention.

FIG. 13 shows an exemplary use of a fold device according to the invention in a laser setup. The laser, here only shown with some of its components, has a pump source 1, for instance a laser diode, pumping a laser medium 3 via a transmitting optics consisting of a collimating lens 2 and a focussing lens 2'. After emerging from the laser medium 3, the beam is guided to the fold device via several deflecting mirrors 7. These deflecting mirrors 7 serve to guide the beam and to adjust it when entering the fold device. In the fold device containing the two elements 6a and 6b, the incident beam ES undergoes multiple forth and back reflection resulting in a folded beam path. The emergent beam AS after passing the fold device is reflected back into the fold device by an additional deflecting mirror 7', and is extracted from the resonator by a coupling-out mirror 7" after passing the fold device in just one direction. In this example, the additional deflecting mirror 7' is oriented so that the emergent beam AS is reflected merely two times in the fold device. If in this example a fold device has been placed inside the laser resonator, potential uses of a fold device according to the invention are not restricted to this configuration but may include fold devices set up as an alternative or in addition outside the resonator.

Figure 14:
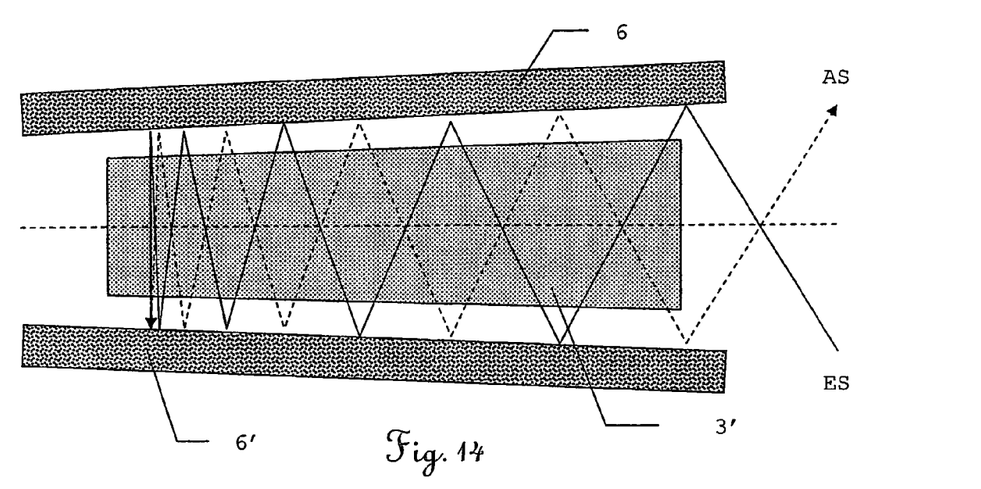
FIG. 14 shows the schematic representation of the arrangement of a laser medium between the surfaces of a fold device according to the invention.

FIG. 14 schematically represents a possible arrangement of laser medium 3' or of another active material in the beam path of a first embodiment of the fold device according to the invention. The incident beam ES (solid line) undergoes multiple reflection at the two elements 6 and 6' with continuously decreasing distance between the reflection points, after each reflection passing once more through laser medium 3'. Having passed through the fold device and laser medium 3', the emergent beam AS leaves the arrangement.

Figure 15:
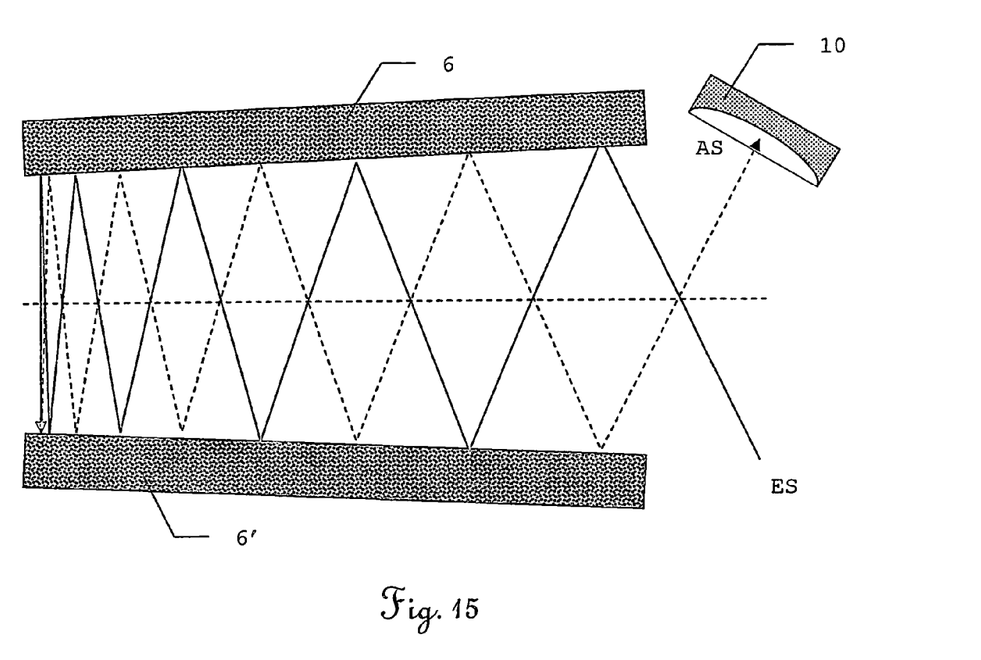
FIG. 15 shows the schematic representation of a fold device according to the invention, including a first realization example of an adjusting element.

FIG. 15 shows the schematic representation of a fold device according to the invention including a first realization example of an adjusting element accounting for adjustment errors by error compensation. The beam ES entering the fold device consisting of the two reflecting elements 6 and 6' undergoes multiple reflections during which a slight initial adjustment error is amplified or accumulated by the large number of reflections. However, an error-affected beam path can be guided in such a way that despite an error that possibly arises, all system requirements are satisfied. In the first realization example, an error correction occurs through a mirror 10 that follows after the reflecting elements 6 and 6' and is curved in one or two planes. The alignment of this mirror 10 is such that an unperturbed emergent beam AS is incident along its mid-vertical. The radius of curvature of mirror 10 is selected so that a deviation from this mid-vertical caused by errors leads to a direction of reflection such that the error is corrected. Here the mirror can be spherical, aspherical, or even astigmatic, and may have different radii of curvature in different planes, for instances in planes parallel and normal to the surfaces of the reflecting elements 6 and 6'. A planar mirror would no longer correctly reflect the beam, even in the presence of just minor deviations from vertical incidence. Using an appropriate curvature of mirror 10, the emergent beam AS can be reflected back into itself or with a slight offset, despite the deviations caused by adjustment errors.

Figure 16:
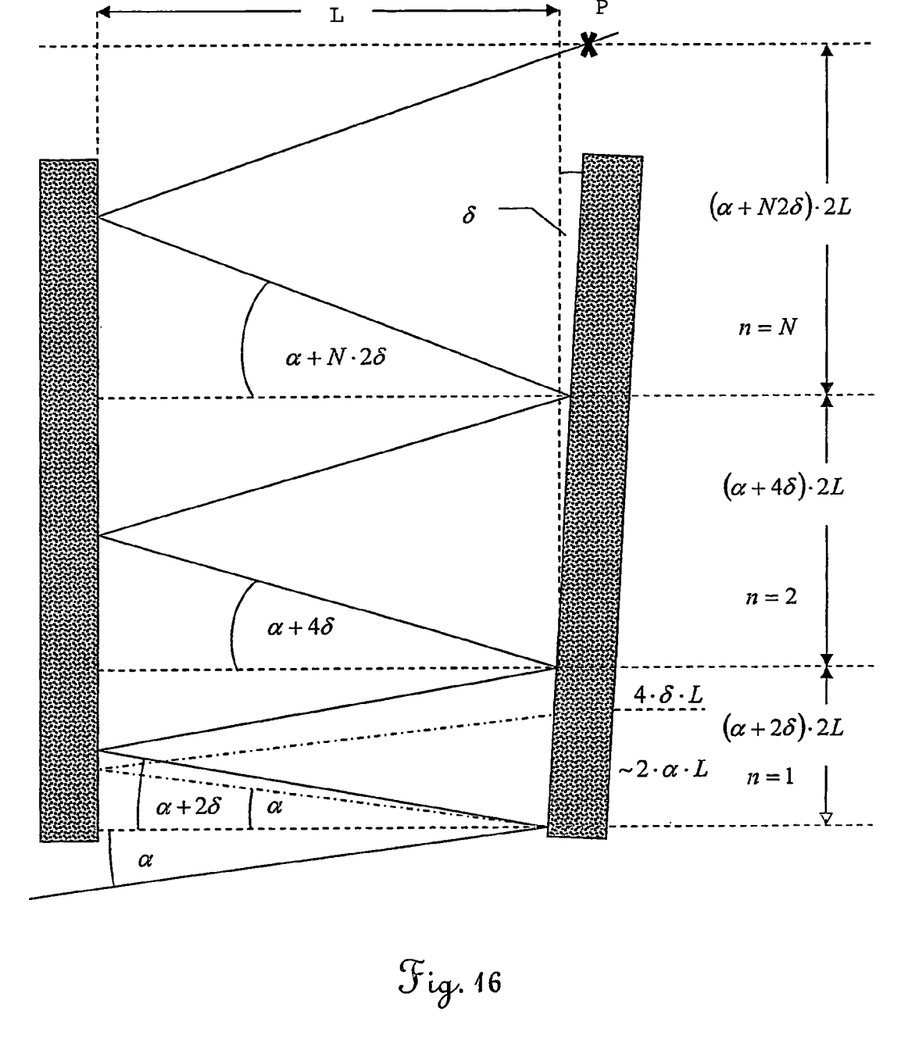
FIG. 16 shows the geometric conditions when adjustment errors are present in a fold device according to the invention.

FIG. 16 shows the geometric situation in the presence of adjustment errors in a fold device according to the invention. In a fold device according to the invention, errors are adding up by multiple reflection when adjustment errors are present. When the fold device is set up within the cavity, this may lead to problems as large as a violation of the laser condition. FIG. 16 graphically shows and explains the effects of adjustment errors. In it, α is the angle of incidence at a reflecting element of a fold device that is oriented vertically or at any other angle,
δ is the error angle in the orientation of the reflecting element, taken as adjustment error,
L is the length between reflecting elements, and
P is the impingement point on a reflecting element after N passes.

The following relationships thus become evident from FIG. 16:

$$\delta_n = 2 \cdot n \cdot \delta \quad (1)$$

as the error angle after n passes, and $$Y_{tot} = 4 \cdot \delta \cdot L \cdot \sum_{n=1}^{N} n = 2 \cdot \delta \cdot L \cdot (N^2 + N) \quad (2)$$

as the total deviation after N passes with an error angle of δ at a reflecting element. It is evident that after N reflections an error angle of 2·N·δ leading to an impingement point P is accumulated relative to an ideal errorfree axis of beam guidance through the fold device. Assuming small error angles δ, the point of intersection between the ideal and the error-affected beam after N reflections thus has a distance from point P that is given by $$\frac{Y_{tot}}{\delta_N} = \frac{2 \cdot \delta \cdot L \cdot (N^2 + N)}{2 \cdot N \cdot \delta} = (N+1) \cdot L \quad (3)$$

and is independent of the error angle δ.

A number of adjusting elements accounting for adjustment errors can be designed on the basis of this realization. For instance, the curved mirror shown in FIG. 15 can be arranged as an adjusting element in point P with a radius of curvature of R=(N+1)·L. This mirror will reflect the beam into itself or slightly offset through the fold device so that the same deviations from an ideal beam path are passed once more. This condition for the radius of curvature has the effect of a 1:1 imaging of the points of intersection between ideal and error-affected beam. This can be used to compensate any error.

Figure 18:
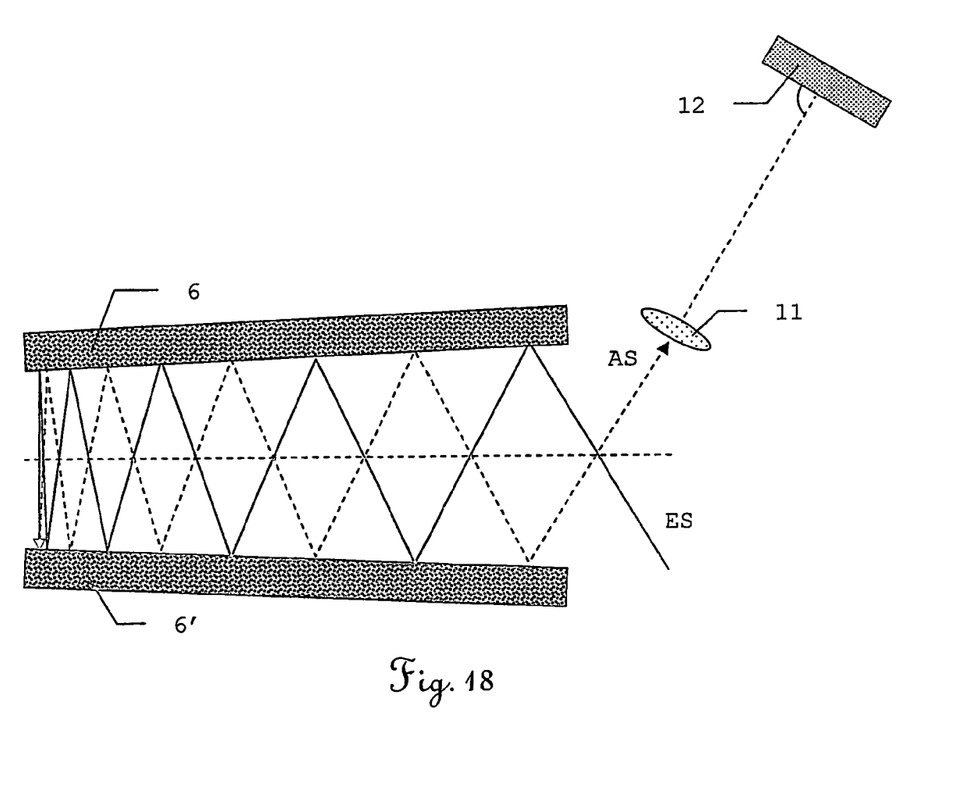
FIG. 18 shows the schematic representation of a fold device according to the invention, including a second realization example of an adjusting element.

Another possibility is the introduction of a collimating element at point P, for instance of the collimating lens from FIG. 18. The focal length f of such a lens will then be selected according to f=(N+1)·L. As an alternative, a curved collimating mirror can be used that has a radius of curvature of R=2·(N+1)·L. The error neutralization does not depend on error angle δ.

Designing a resonator with fold device and integrated adjusting element for error compensation requires an adjustment or tuning of the resonator optics, in order to enable stable operation for the Gaussian fundamental mode. Such adjustments, which must be performed in each individual case, can for instance be calculated by a matrix formalism such as that described in *Lasers* by Siegman, A. E., University Science Books, 1986, ISBN 0935702113.

Figure 17A:
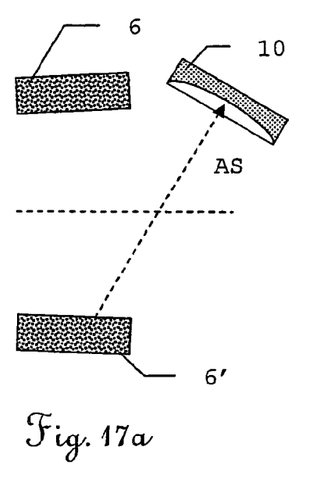
FIG. 17a-c show the schematic representation of the function of the first realization example of an adjusting element.
Figure 17B:
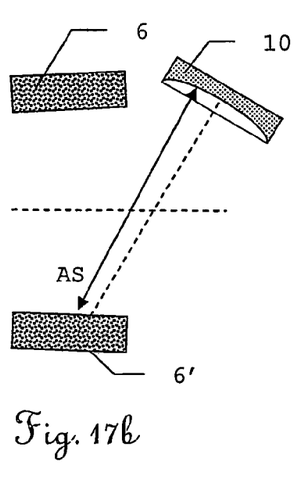
Figure 17C:
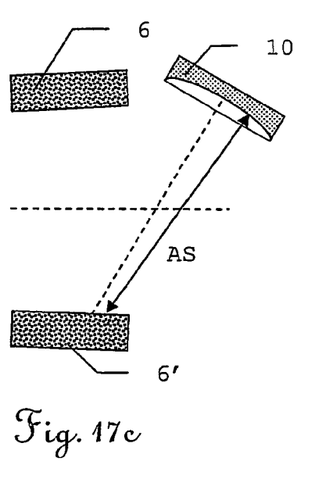

FIGS. 17*a-c* schematically represent such a function for the first realization example of an adjusting element. FIG. 17*a* shows the beam path for an alignment of the fold device without adjustment error. The emergent beam AS strikes the mirror 10 exactly along its mid-vertical, and is reflected back into itself. FIG. 17*b* schematically shows the influence of a first adjustment error having the effect of shifting the last reflection point toward the interior of the fold device, in which case reflection occurs with a steeper angle. This causes the emergent beam AS to strike mirror 10 away from its center, where again it is reflected back into itself and toward the reflecting element 6'. The compensation of an adjustment error with opposite effects is shown in FIG. 17*c*. In the error-affected case, the last reflection point is now outside the errorfree reflection point. Mirror 10 again causes back reflection. The representation selected here is purely schematic.

FIG. 18 shows the schematic representation of a fold device according to the invention including a second realization example of an adjusting element. In this realization example an error correction occurs by a sequence of lens 11 and mirror 12 following after the reflective elements 6 and 6'. Lens 11 is placed at a distance from the last reflecting element 6' that corresponds to its focal length, so that the emergent beam is collimated by lens 11. This implies that with respect to the following mirror 12 which for instance may also be one of the end mirrors of the resonator, the laser condition of incidence along the normal is satisfied.

Figures 19A, 19B, 19C:
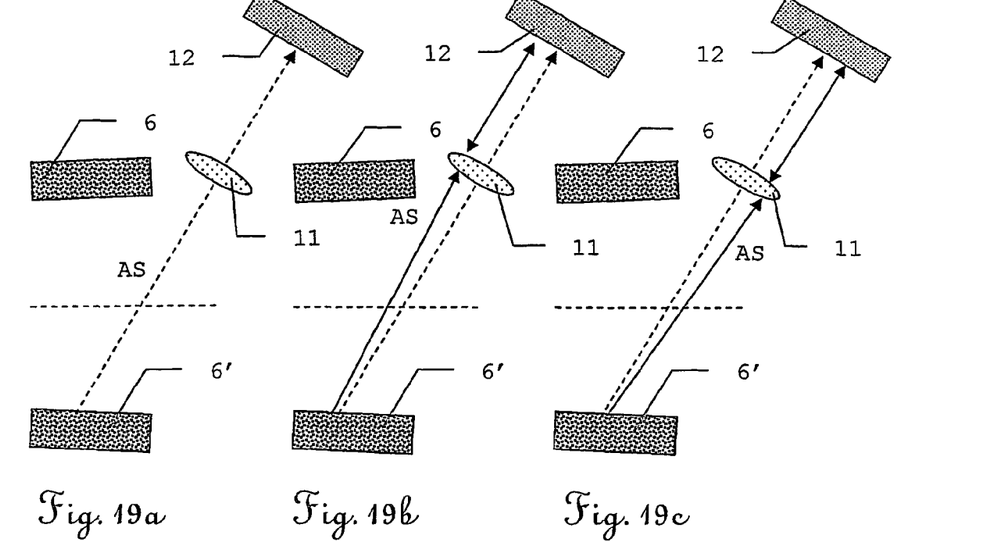
FIG. 19a-c show the schematic representation of the function of the second realization example of an adjusting element.

FIGS. 19*a-c* schematically explain the functioning of the second realization example. FIG. 19*a* shows the beam path for an alignment of the fold device without adjustment error. The emergent beam AS strikes the lens in the optical axis and is passed on to mirror 12 without refraction. FIG. 19*b* schematically shows the influence of a first adjustment error that causes the last reflection point to be shifted in the direction of the interior of the fold device, so that reflection occurs under a steeper angle. This implies that the emergent beam AS strikes lens 11 outside the optical axis, and is collimated by this lens, so that behind the lens the beam path is parallel to the optical axis and the laser condition continues to be satisfied at mirror 12. Thus, a direct compensation of the error does not occur. In this realization example, the adjusting element has the effect that the consequences of adjustment errors have a neutral result with respect to the fold device. FIG. 19c shows how to account for an adjustment error that has the opposite effect. In the error-affected case, the last reflection point is outside the region of errorfree reflection points. Lens 11 once more collimates the beam, which keeps the altered position and its consequences on the beam path neutral. Here the exact shape of lens 11 will depend on the special geometry of the fold device and on the position of the adjusting element consisting of lens 11 and mirror 12.

Figure 20A:
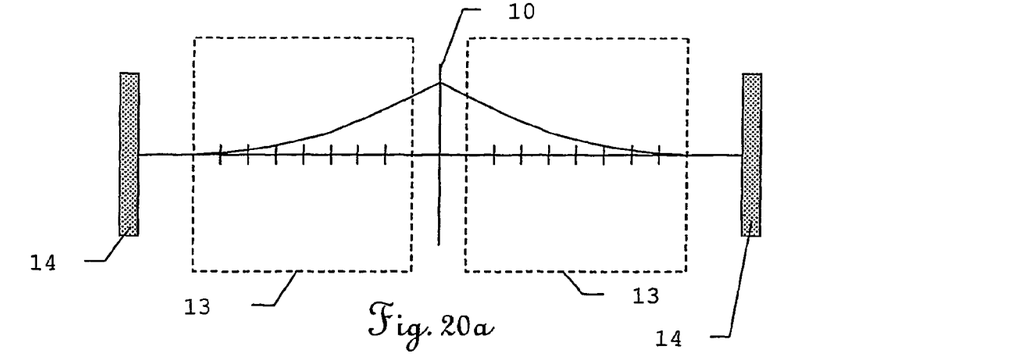
FIG. 20a-b show the schematic representation of adjustment of the beam path to adjustment errors in the fold device.
Figure 20B:
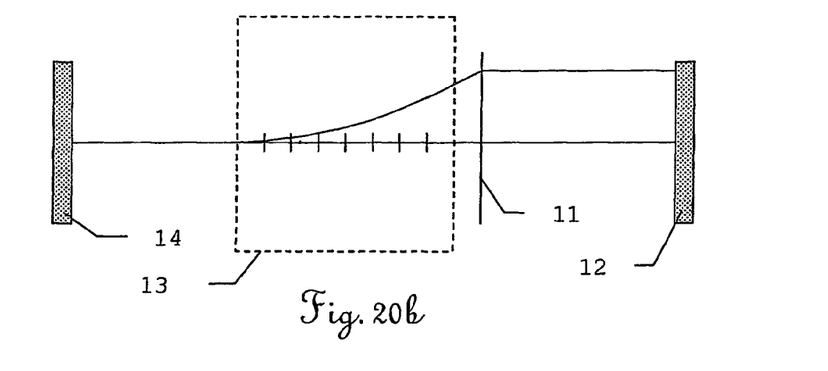

FIGS. 20a-b show the schematic representation of adjustment of the beam path for adjustment errors of the fold device.

FIG. 20a explains the effect of the first realization example of the adjusting element with curved mirror 10. The figure shows the length-dependent resonator layout from an end mirror 14 through the fold device and subsequent reflection at mirror 10, back to the same end mirror 14. This figure thus shows the twofold passage through the fold device in a horizontal view. The box in phantom lines corresponds to the region of multiple reflections 13 within the fold device, with a back reflection occurring at mirror 10. In the vertical direction, the extent of departure relative to a beam path without adjustment error is shown purely schematically. In the region of multiple reflections 13, an error is increasingly accumulated which, after suitable back reflection by mirror 10, is gradually redispersed. Through error compensation, the fold device including its adjusting element is neutral to adjustment errors with respect to the conditions at end mirror 14.

FIG. 20b describes the conditions for the second realization example of an adjusting element. Once more the end mirror 14 of a resonator is shown. However, horizontally the twofold passage through the fold device is not shown. The right-hand termination of the beam path in this realization example is constituted by mirror 12 of the adjusting element. Here the error caused by adjustment is not compensated but a lens 11 affects the beam path in such a way that the consequences of the error constantly remain zero, the laser condition at mirror 12 being satisfied.

It is understood that the figures represented represent one of many embodiments, and one skilled in the art will be able to derive alternative realizations of the laser structure, e.g., using other laser setups or resonator components. It is possible in particular to provide fold devices in designs differing from the examples shown, for instance by providing reflecting surfaces having angles that vary between sections, or by arranging the required components in a different way.

Also, the angles shown for the beam paths only serve to explain the consequences of particular realizations of the different embodiments, and may depart for reasons of graphical representation from the exact physical conditions, for instance with respect to Brewster's law. In particular, no quantitative or limiting geometric information can be derived from them.

The invention claimed is:

1. A fold device comprising:
at least two entirely straight reflecting planar surfaces for folding a beam path of a laser beam, the at least two entirely straight reflecting planar surfaces are arranged so that:
the at least two entirely straight reflecting planar surfaces are each fixed in a predetermined position so that the at least two entirely straight reflecting planar surfaces are not parallel;
the laser beam is multiply reflected at each one of the at least two entirely straight reflecting planar surfaces; and
the beam path entering the fold device as an input beam path, reversing within the fold device, and exiting the fold device as an output beam path, the input beam path and the output beam path tracing different paths.

2. The fold device according to claim 1, wherein at least one surface among the at least two entirely straight reflecting planar surfaces is formed as:
an outer surface;
an inner surface; or
an interface of at least one component of the fold device.

3. The fold device according to claim 1, wherein the fold device is designed as a single part.

4. The fold device according to claim 1, wherein the fold device has at least one Brewster window.

5. The fold device according to claim 4, wherein the fold device has at least two adjacent Brewster windows.

6. The fold device according to claim 1, wherein the fold device has a laser medium or is configured as a laser medium.

7. The fold device according to claim 1, wherein at least a first surface among the at least two entirely straight reflecting planar surfaces has a shape that differs from that of a second one among the at least two entirely straight reflecting planar surfaces.

8. The fold device according to claim 1, further comprising at least one additional segment connected to and set at an angle relative to one of the at least two entirely straight planar surfaces.

9. The fold device according to claim 1, wherein the fold device is designed so as to influence the properties of the laser beam.

10. The fold device according to claim 1, wherein the fold device has at least one of the following properties:
dispersive,
degrading in light,
changing the frequency, and
saturably absorbing.

11. The fold device according to claim 1, further comprising an adjusting element accounting for adjustment of errors.

12. The fold device according to claim 11, wherein the adjusting element is so designed and arranged that a back reflection of the laser beam in itself or with slight offset is produced.

13. The fold device according to claim 11, wherein the adjusting element is so designed and arranged that the laser beam is collimated and guided to a resonator mirror.

14. A method for stretching or compressing laser pulses utilizing the fold device according to claim 1.

15. A laser arrangement comprising:
an amplifying laser medium for producing a laser beam,
a laser resonator with at least one resonator mirror, and
the fold device according to claim 1.

16. The laser arrangement according to claim 15, having at least two fold devices in series, each of the fold devices having at least two entirely straight reflecting planar surfaces for folding of a beam path of a laser beam, the at least two entirely straight reflecting planar surfaces are arranged in such a way that:
the at least two entirely straight reflecting planar surfaces are oriented relative to each other and with an angle of aperture;
the laser beam is reflected at least at one of the at least two entirely straight reflecting planar surfaces at least twice; and
the beam path having a beam incident into the fold device and a beam emergent from the fold device.

17. The laser arrangement according to claim 15, wherein at least a first fold device is designed and arranged for folding of the beam path of the laser beam, and at least a second fold device is designed and arranged for dispersion correction.

18. The laser arrangement according to claim 15, wherein at least one mirror is designed and arranged for incoupling or outcoupling the laser beam into or from the fold device.

19. The laser arrangement according to claim 15, wherein the fold device is designed and arranged as one end of the laser resonator.

20. The laser arrangement according to claim 15, wherein the laser arrangement is designed as regenerative amplifier.

21. The fold device according to claim 1, wherein the angle of aperture is adjustable.

22. The fold device according to claim 3, wherein the fold device is designed as a monolithic body.

23. The fold device according to claim 7, wherein the first surface has an intent that differs from that of a second one among the at least two entirely straight reflecting planar surfaces.

24. The fold device according to claim 9, wherein the fold device is designed so as to influence the properties of the laser beam by nonlinear effects.

25. The fold device according to claim 10, wherein at least one of the at least two entirely straight reflecting planar surfaces of the fold device has at least one of the following properties:
dispersive,
degrading in light,
changing the frequency, and
saturably absorbing.

26. The fold device according to claim 12, wherein the back reflection is produced by a curved mirror.

27. The fold device according to claim 13, wherein the laser beam is collimated and guided by a reflective or refractive element.

28. The fold device according to claim 16, wherein the angle of aperture is adjustable.

29. The fold device according to claim 18, wherein the at least one mirror is adjustable.

* * * * *